United States Patent [19]

Joerg et al.

[11] Patent Number: 5,396,969
[45] Date of Patent: Mar. 14, 1995

[54] SERVO CONTROL, ESPECIALLY POWER STEERING FOR MOTOR VEHICLES

[75] Inventors: Wolfgang Joerg, Stuttgart; Arno Roehringer, Ditzingen, both of Germany

[73] Assignee: Mercedes Benz AG, Stuttgart, Germany

[21] Appl. No.: 168,121

[22] Filed: Dec. 16, 1993

[30] Foreign Application Priority Data

Dec. 16, 1992 [DE] Germany .................. 42 42 441.0

[51] Int. Cl.⁶ .............................................. B62D 5/08
[52] U.S. Cl. ................................... 180/132; 180/149; 91/375 A
[58] Field of Search ............... 180/132, 141, 146, 149; 91/375, 375 A

[56] References Cited

U.S. PATENT DOCUMENTS

| | | | |
|---|---|---|---|
| 4,632,204 | 12/1986 | Honaga et al. | 180/149 |
| 5,078,226 | 1/1992 | Inagaki et al. | 180/141 |
| 5,186,272 | 2/1993 | Smith | 180/132 |

FOREIGN PATENT DOCUMENTS

| | | | |
|---|---|---|---|
| 0121157 | 10/1943 | Australia | 91/375 |
| 2412548 | 9/1974 | Germany . | |
| 3690102C2 | 6/1991 | Germany . | |
| 0283569 | 11/1990 | Japan | 180/149 |

Primary Examiner—Margaret A. Focarino
Assistant Examiner—Victor E. Johnson
Attorney, Agent, or Firm—Evenson, McKeown, Edwards & Lenahan

[57] ABSTRACT

The invention relates to a servo control, especially a power steering for motor vehicles, with a fluidic reaction control which is designed in the manner of a rotary slide and which constitutes a component which can fundamentally be separated from a servo-valve arrangement.

23 Claims, 3 Drawing Sheets

SERVO CONTROL, ESPECIALLY POWER STEERING FOR MOTOR VEHICLES

BACKGROUND AND SUMMARY OF THE INVENTION

The invention relates to a servo control system, especially a power steering system for motor vehicles of the type which include:
- a shaft which serves as an actuating member or is coupled thereto and which is subdivided axially into an input-side primary-shaft part and an output-side secondary-shaft part,
- a spring arrangement which drive-connects the shaft parts and which allows a relative rotation between the shaft parts,
- a servo-valve arrangement working in dependence on the relative rotation, with an inflow connection assigned to a pressure source or pump, with an outflow connection assigned to an essentially pressureless reservoir, and with two working connections which are assigned to a servomotor and between which a pressure difference dependent on the amount and direction of the relative rotation can be generated, and
- a fluidic reaction control for generating a reaction force counteracting the particular direction of actuation of the shaft, the one shaft part being arranged, for the purpose of forming the reaction control, with a portion within a bush part which is arranged fixedly in terms of rotation on the other shaft part and which, together with the portion, forms a double-acting rotary-blade unit with oppositely acting chambers, in which the pressure in one chamber seeks to bring about a relative rotation of the bush part and portion in one direction and the pressure in the other chamber seeks to bring about a relative rotation in the other direction.

Servo controls of this type are known, for example, from German patent document DE-A 2,412,548. Where a vehicle steering is concerned, as result of the reaction control, some resistance can be felt on the steering handwheel, at least within a middle range of the possible steering angles, and this resistance is correlated with the steering forces actually to be exerted. The driver is thereby given a good feel for the particular driving state.

In this respect, it is basically known to cause the reaction control to work in a parameter-dependent manner, for example in dependence on the driving speed, for instance in such a way that the steering becomes heavier at a higher driving speed.

Reference can be made, in this regard, to German patent document DE-C-3,690,102 from which it is known to connect the inflow of a fluidic reaction control to the pressure source via a throttle valve controllable in a parameter-dependent manner.

An object of the invention, in a servo control of the type mentioned in the introduction, is to produce an especially simple construction.

This object is achieved, according to the invention, in that the rotary-blade unit has two chambers, in that each chamber can be connected to the reservoir via a throttle and to an inflow via a controllable slot between mutually cooperating control edges on the bush part and on the portion, in that the two slots are both at least virtually closed in a middle position of the bush part and portion, whilst a respective slot opens in the event of a relative rotation between the bush part and portion, and in that the inflow is connected to the pressure source via a throttle valve controllable in a parameter-dependent manner.

In the invention, therefore, the reaction control constitutes a member which can, in principle, be separated from the servo-valve arrangement and which is fluidically connected in parallel with the servo-valve arrangement between the pump or pressure source and the reservoir. This affords the advantageous possibility of allowing a modular construction, in order to produce and arrange the servo control or power steering with or without a reaction control, as required.

It is advantageous, furthermore, if the throttle valve is arranged in series in front of the rotary-blade or rotary-piston unit. This affords the advantage, in comparison with a basically possible arrangement of the controllable throttle valve between the rotary-blade or rotary-piston unit and the reservoir, that the chambers of the rotary-blade or rotary-piston unit are loaded only by comparatively moderate pressures and the respective sealing elements are correspondingly subjected to comparatively little load. Moreover, in the middle position, the chambers of the rotary-blade or rotary-piston unit are substantially pressure-free because the slots are then (virtually) closed, with the result that the seals of the chambers are subjected to hardly any stress in the very frequently occurring middle position.

This affords the further advantage that the seals can work with a low pressing force and accordingly with low friction, with the result that a good operating behavior of the power steering, with low hysteresis, becomes possible.

According to an especially preferred embodiment of the invention, the shaft parts are connected to one another via a torsion bar which passes through an axial cavity in the one shaft part so as to leave an annular space free, and this annular space is connected to the reservoir and, via throttle bores passing through the wall of the shaft part, is connected to the chambers of the rotary-blade or rotary-piston unit. An especially compact and slim design can be achieved thereby.

A so-called cut-off valve is expediently arranged between the inflow and throttle valve and, above a threshold value of the pressure of the inflow, breaks its connection to the controllable throttle valve and therefore to the pump or pressure source. In this way, the reaction force occurring can be limited to a desired value in a constructively simple way.

The controllable throttle valve is typically controlled in a parameter-dependent manner by means of an electronic control circuit. Provision is made here, in the conventional way, for the control circuit constantly to check itself for malfunctions and to stop if faults occur. In this case, the actuating member of the controllable throttle valve, usually an electromagnet, is isolated from its energy supply. At the same time, the controllable throttle valve is expediently designed so that it then assumes a relatively unthrottled state, in which the reaction forces which can be generated are comparatively high. Where a power steering of a motor vehicle is concerned, this guarantees that the steering works in the operating mode for a high driving speed and a high degree of safety accordingly remains guaranteed. It is merely necessary to allow for some loss of comfort, since the steering then works somewhat more heavily than usual at low driving speeds.

3

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
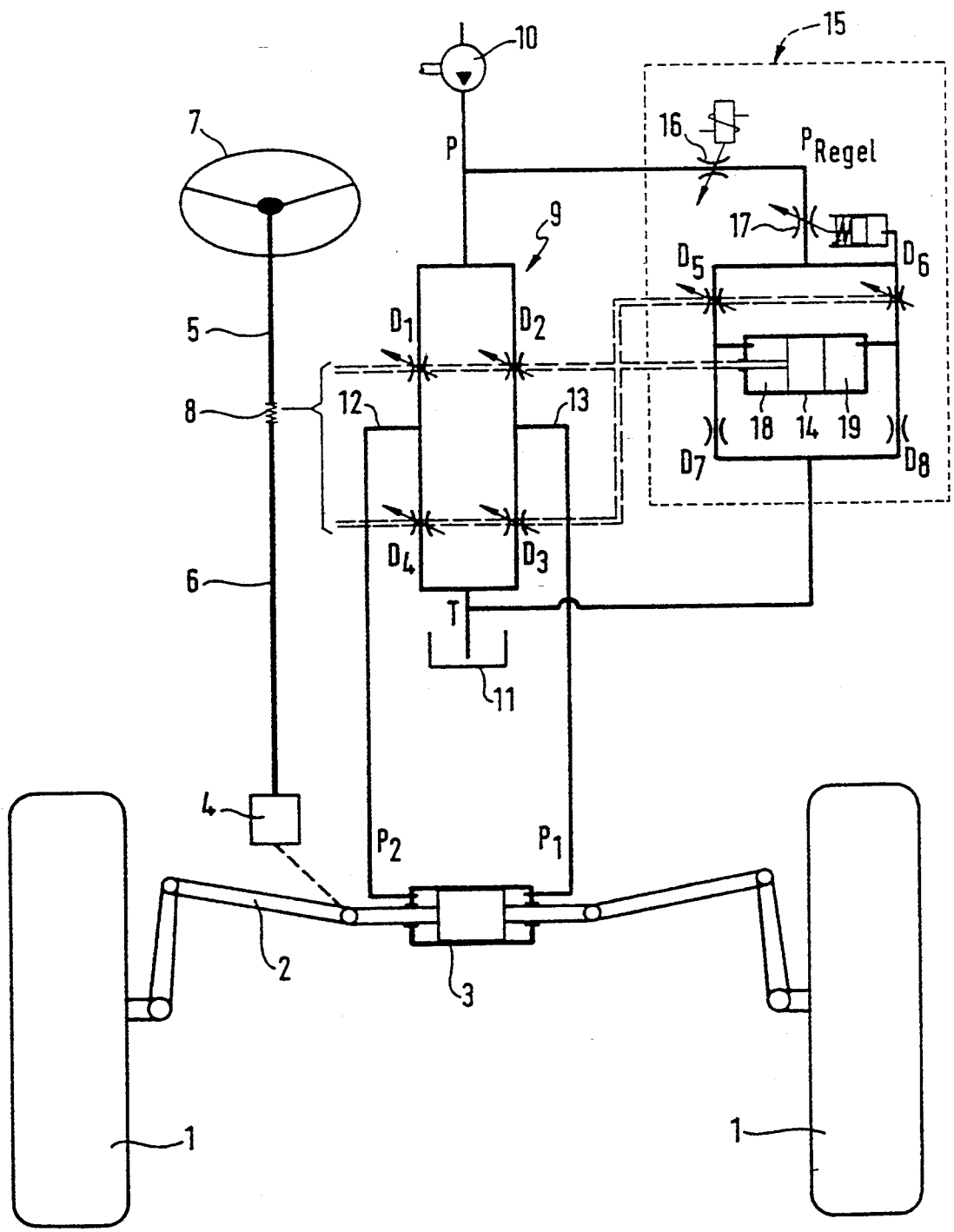
FIG. 1 shows a schematic representation of a power steering according to the invention in the manner of a circuit diagram.

According to FIG. 1, a motor vehicle, otherwise not shown, has steerable wheels which are coupled to one another in a known way via a steering linkage 2 having a double-acting piston/cylinder unit 3. Furthermore, the steering linkage 2 is coupled to a steering handwheel 7 via a steering gear 4 and a steering shaft subdivided into a primary-shaft part 5 and a secondary-shaft part 6.

The primary-shaft part 5 and the secondary-shaft part 6 are connected to one another via a spring 8, for example in the form of a torsion bar, so that, in steering manoeuvres, there occurs between the primary-shaft part 5 and secondary-shaft part 6 some relative rotation of an amount which depends on the torques (steering moments) loading the steering shaft.

This relative rotation controls a servo-valve arrangement 9 which is connected on the inflow side to the delivery side of a pump 10 and on the outflow side to an essentially pressureless reservoir 11, to which the suction side of the pump 10 is also connected.

The servo-valve arrangement 9 consists in functional terms of two parallel throttle stages having the controllable throttles $D_1$ to $D_4$, and, depending on the direction of rotation of the relative rotation between the primary-shaft part 5 and secondary-shaft part 6, the throttle resistance of the throttles $D_1$ and $D_3$ is either decreased, with a simultaneous increase in the throttle resistance of the throttles $D_2$ and $D_4$, or is increased, with a simultaneous decrease in the throttle resistance of the throttles $D_2$ and $D_4$.

Depending on the amount of relative rotation between the primary-shaft part 5 and secondary-shaft part 6, there then occurs between the pressures in two working connections 12 and 13 of the servo-valve arrangement 9 a more or less large pressure difference between the pressures $P_1$ and $P_2$ prevailing at the working connections 12 and 13. This pressure difference loads the piston of the piston/cylinder unit 3 in such a way that the actuating forces to be exerted on the steering handwheel 7 are reduced.

Moreover, as a result of the relative rotation between the primary-shaft part 5 and secondary-shaft part 6 or the adjustment of the servo-valve arrangement 9, a double-acting displacement member 14 of a reaction control 15 is adjusted.

The reaction control 15 is connected fluidically or, especially, hydraulically in parallel with the servo-valve arrangement 9 between the delivery side of the pump 10 and the reservoir 11. On the inflow side, the reaction control 15 possesses a throttle valve 16 which can be controlled in a parameter-dependent manner and

4 which is followed by a cut-off valve 17 which assumes a blocking state when the pressure on its outflow side exceeds a predetermined set value.

Two parallel throttle stages having the throttles $D_5$ to $D_8$ are arranged in series behind the cut-off valve 17, the throttles $D_5$ and $D_6$ being controlled as a result of the shift of the displacement member 14. In a middle position, the two throttles $D_5$ and $D_6$ are, at least virtually, closed. During the shift of the displacement member 14, a particular one of these throttles is then opened, while the other remains closed or is closed to an increased extent. The throttles $D_7$ and $D_8$ are constant throttles.

Chambers 18, 19 assigned to the displacement member 14 are connected between the throttles $D_5$, $D_7$ and $D_6$, $D_8$ respectively. In the middle position of the displacement member 14, the two chambers 18 and 19 are virtually pressureless, because the two throttles $D_5$ and $D_6$ are closed. When the displacement member 14 shifts, a particular one of the chambers 18 or 19 receives pressure, so that a corresponding force in one direction or the other acts on the displacement member 14, specifically in such a way that a corresponding steering resistance can be felt on the steering handwheel 7. The strength of this steering resistance can be varied by controlling the throttle valve 16, for example in dependence on the driving speed of the vehicle.

The maximum pressure forces acting on the displacement member 14 are limited by the cut-off valve 17, so that the steering resistance caused by the displacement member 14 also remains limited to a corresponding extent.

Figure 2:
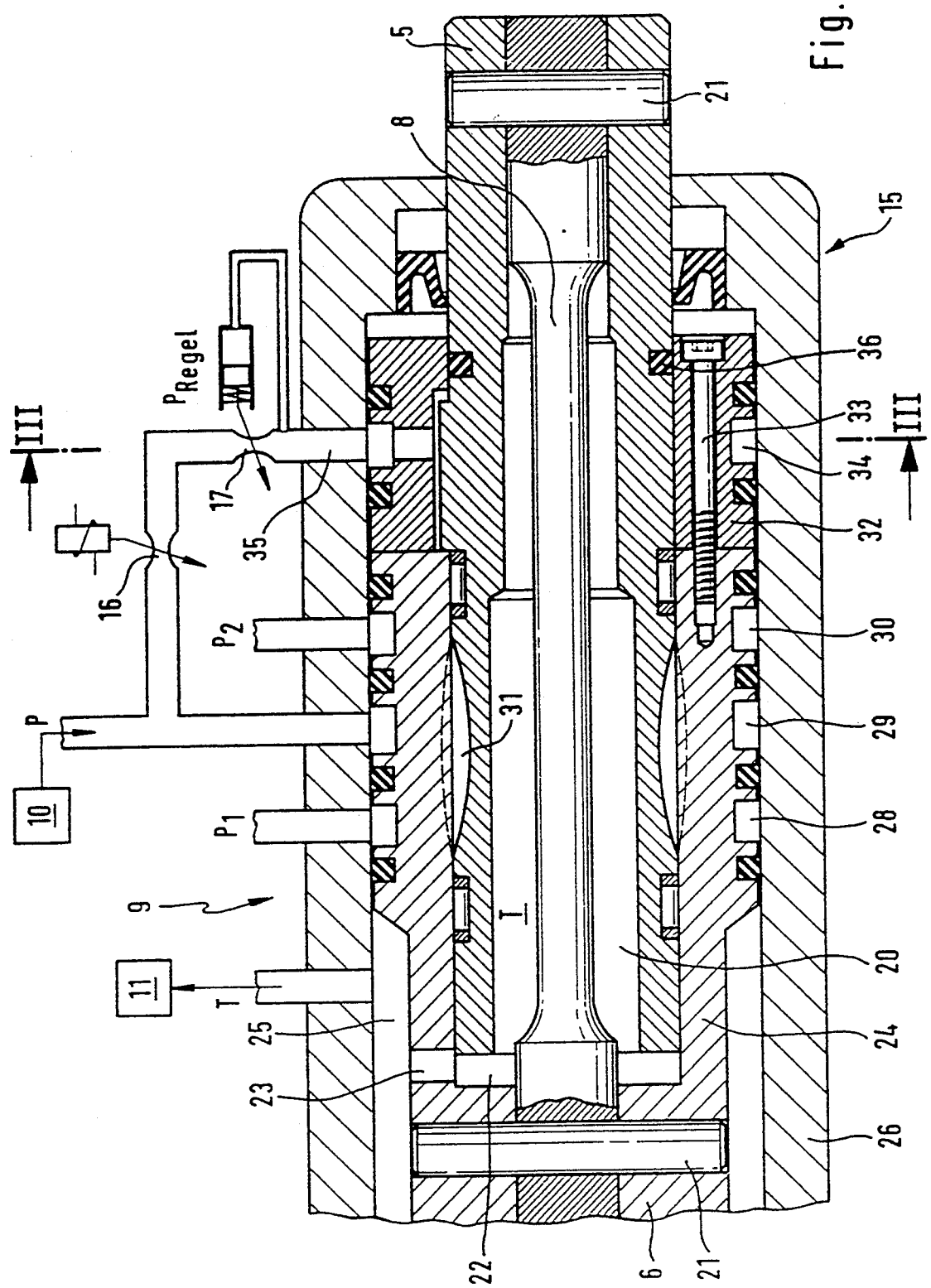
FIG. 2 shows an axial section through the servo-valve and the reaction control of the power steering system of FIG. 1.
Figure 3:
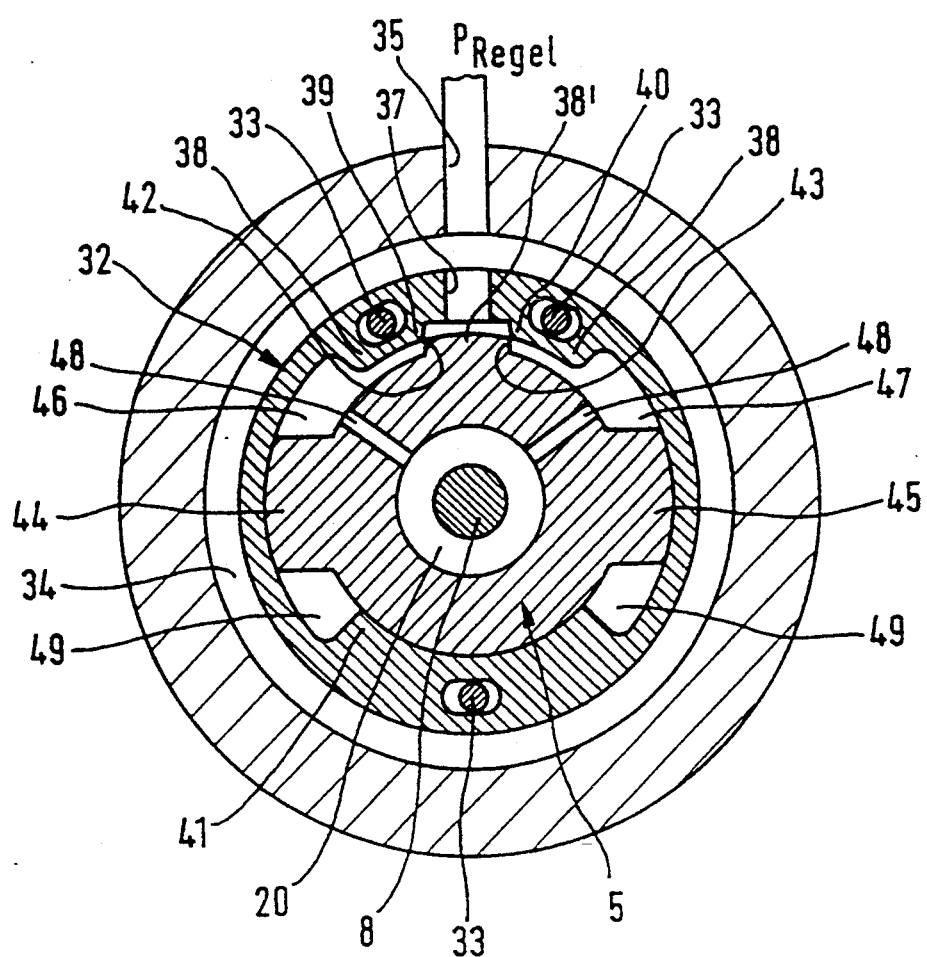
FIG. 3 shows a radial section through the reaction control along the sectional line III—III in FIG. 2.

FIGS. 2 and 3 show the constructive arrangement or design of the servo-valve arrangement 9 and reaction control 15, together with arrangement of the primary-shaft part 5 and of the secondary-shaft part 6.

The primary-shaft part 5 is drive-connected to the secondary-shaft part 6, arranged coaxially with it, via the torsion bar 8 which is accommodated essentially within an axial cavity 20 of the primary-shaft part 5 and which is fastened at its ends fixedly in terms of rotation to the primary-shaft part 5 to the secondary-shaft part 6 by means of pins 21. Since the cross-section of the torsion bar 8 is smaller than the cross-section of the cavity 20, there remains free in the cavity 20 an annular space communicating with a clearance space 22 which is vacant between the end of the primary-shaft part 5 on the left in FIG. 2 and the adjacent secondary-shaft part 6. This clearance space communicates with a radial bore 23 in the bush-shaped extension 24 of the secondary-shaft part 6 and therefore with an annular space 25 between a housing 26 and the secondary-shaft part 6. The annular space 26 is connected to the reservoir 11 via a housing bore or a conduit connected thereto.

The bush-shaped extension 24 possesses circumferential grooves 28 to 30 which are closed off relative to the housing 26 on their sides by means of seals, so that corresponding annular spaces are formed by these circumferential grooves between the bush-shaped extension 24 and the housing 26. As regards the circumferential groove 29, these are connected to the delivery side of the pump, and as regards the circumferential grooves 28 and 30 they are connected to the piston/cylinder unit 3 which can be seen in FIG. 1.

Via control edges 31, not shown in more detail, which are arranged on the inside of the bush-shaped extension 24 and on the region, covered by this, on the outside of the primary-shaft part 5 and which in functional terms form the throttles $D_1$ to $D_4$ evident from FIG. 1, hydraulic medium coming from the pump 10 flows from the circumferential groove 29 into the cavity 20 and therefore, via the clearance space 22 as well as the annular space 25 and a housing bore, to the reservoir 11. At the same time, the pressures $P_1$ and $P_2$ occur in the annular grooves 28 and 30, the particular pressure difference and its polarity depending on the amount and direction of relative rotation between the primary-shaft part 5 and the secondary-shaft part 6 or the bush-shaped extension 24.

A bush part 32 adjoins the bush-shaped extension 24 axially, and, for example, screws 33 passing through long-hole bores in the bush part 32 can serve for fastening the latter to the extension 24. At the same time, the long-hole cross-section is oriented in a circumferential direction of the bush part 32, so that, for adjustment purposes, the bush part 32 can be fasted to the bush-shaped extension 24 in different rotary positions.

The bush part 32 possesses an annular groove 34 closed off laterally relative to the housing 26 by means of seals, so that a corresponding annular space is formed between the housing 26 and the bush part 32. This annular space is connected to the outflow of the cut-off valve 17 via a housing bore 35.

The bush part 32 is closed off, at its end on the right in FIG. 2, relative to the primary-shaft part 5 by means of a seal 36. At the other end, sealing takes place via the confronting closed end face of the bush-shaped extension 24 and the sealing of the latter relative to the primary-shaft part 5.

The bush part 32 has the cross-section evident from FIG. 3 between the confronting end face of the bush-shaped extension 24 and the region of the seal 36. Axial control edges 39 and 40 are arranged on wide axial ribs 38 on both sides of a radial inflow bore 37. The inside of the axial ribs 38 which laterally adjoins the control edges 39 and 40 is curved centrically relative to the longitudinal axis of the bush part 32. Adjacent to the axial ribs 38 on both sides is a region of enlarged inside diameter of the bush part 32. The wall of the bush part 32 is itself thickened inwards opposite the inflow bore 37, the inside of the thickening 41 being curved centrically relative to the longitudinal axis of the bush part 32.

Within the bush part 32, the primary-shaft part 5 possesses two control edges 42 and 43 which cooperate with the control edges 39 and 40 located on the bush and which are arranged in such a way that, in the illustrated middle position of the bush part 32 and primary-shaft part 5, no or virtually no gap remains free between the pairs of control edges 39, 42 and 40, 43.

In the vent of relative rotation between the bush part 32 and primary-shaft part 5, a gap is opened either between the control edges 39 and 42 or the control edges 40 and 43, whilst, on the other side respectively, the circumferential region of the primary-shaft part 5 between the control edges 42 and 43 cooperates sealingly with an axial rib 38' of the bush part 32.

The gap openings between the control edges 39, 42 and 40, 43 correspond in functional terms to the throttles $D_5$ and $D_6$ in FIG. 1.

In the region between the thickening 41 and the axial ribs 38, the primary-shaft part 5 possesses two blades 44 and 45 which bear sealingly on their outer circumferential side against the inner circumferential side of the bush part 32.

There are thus formed between the bush part 32 and primary-shaft part 5 two chambers 46 and 47 which are connected to the cavity 20 in the primary-shaft part 5 via throttle bores 48.

The chambers 46 and 47 correspond in functional terms to the two working spaces of the displacement member 14 in FIG. 1, whilst the throttle bores 48 correspond to the throttles $D_7$ and $D_8$ in FIG. 1.

Moreover, there still remain between the bush part 32 and the primary-shaft part 5 free spaces 49 which are connected via orifices (not shown) to the cavity 20 in the primary-shaft part 5 and which, together with the chambers 46 and 47, allow a rotational movement of the blades 44 and 45 or of the primary-shaft part 5 relative to the bush part 32.

Thus, when a relative rotation in relation to the middle position shown in FIG. 3 occurs between the primary-shaft part 5 and the secondary-shaft part 6 or the bush part 32 connected fixedly in terms of rotation thereto, either only the chamber 46 or only the chamber 47 is connected to the outflow of the cut-off valve 17 or of the controllable throttle valve 16 arranged in series in front of the latter, so that a corresponding pressure is generated in the respective chamber 46 or 47. In the chamber 46, this pressure seeks to rotate the primary-shaft part 5 relative to the bush part 32 in the anti-clockwise direction, whilst a corresponding pressure in the other chamber 47 acts in the opposite direction.

In this way, a torque which can be felt as a steering resistance on the steering handwheel 7 can be generated between the primary-shaft part 5 and the bush part 32 or the secondary-shaft part 6 connected fixedly in terms of rotation thereto.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Servo control arrangement, adapted for power steering for motor vehicles, comprising:
    a shaft which serves as an actuating member and which is subdivided a first shaft part and a second shaft part,
    a spring arrangement drivingly connecting the first and second shaft parts while allowing a relative rotation between the first and second shaft parts,
    a servo-valve arrangement working in dependence on the relative rotation of the first and second shaft parts, comprising an inflow connection connected to a pressure source, an outflow connection connected to an essentially pressureless reservoir, and two working connections which are connected to a servomotor and between which working connections a pressure difference ($P_1 - P_2$) is generated dependent on the amount and direction of the relative rotation of the first and second shafts, and
    a fluidic reaction control for generating a reaction force counteracting a particular direction of actuation of the first and second shaft parts, said reaction control including a bush part surrounding a portion of the first shaft part, said bush part being rotatably fixed with the second shaft part, said bush part and portion of the first shaft forming a double-acting rotary-blade unit with oppositely acting chambers, in which the pressure in one chamber seeks to bring about a relative rotation of the bush part and the portion of the first shaft part in one direction and the pressure in the other chamber seeks to bring about a relative rotation in the bush part and the portion of the first shaft part in the other direction, wherein the rotary-blade unit has two chambers, each of said chambers being connectable to the reservoir via a throttle and to an inflow via a controllable slot between mutually cooperating control edges on the bush part and on the portion of the first shaft part, and wherein the two slots are both at least virtually closed in a middle position of the bush part and portion of the first shaft part, while respective ones of said slots opens in the event of a relative rotation between the bush part and portion of the first shaft part.

2. Servo control arrangement according to claim 1, wherein the first and second shaft parts are connected to one another via a torsion bar serving as said spring arrangement, which torsion bar extends through an axial cavity in the first shaft part so as to leave an annular space free, and wherein this annular space is connected to the reservoir and, via throttle bores passing through a wall of the first shaft part, is connected to the chambers.

3. Servo control arrangement according to claim 1, wherein the inflow is connected to the pressure source via a controllable throttle valve which controls the inflow pressure in response to at least one vehicle operating parameter, and wherein a cut-off valve is arranged between the inflow and the controllable throttle valve, which cut-off valve breaks its connection to the controllable throttle valve or to the pressure source above a threshold value of the pressure at the inflow.

4. Servo control arrangement according to claim 2, wherein the inflow is connected to the pressure source via a controllable throttle valve which controls the inflow pressure in response to at least one vehicle operating parameter, and wherein a cut-off valve is arranged between the inflow and the controllable throttle valve, which cut-off valve breaks its connection to the controllable throttle valve or to the pressure source above a threshold value of the pressure at the inflow.

5. Servo control arrangement according to claim 1, wherein the bush part is firmly connected releasably to a bush-like extension of the second shaft part which is arranged fixedly in terms of rotation thereon and which is designed with a region of the first shaft part covered by it as a rotary slide servo-valve arrangement.

6. Servo control arrangement according to claim 2, wherein the bush part is firmly connected releasably to a bush-like extension of the second shaft part which is arranged fixedly in terms of rotation thereon and which is designed with a region of the first shaft part covered by it as a rotary slide servo-valve arrangement.

7. Servo control arrangement according to claim 3, wherein the bush part is firmly connected releasably to a bush-like extension of the second shaft part which is arranged fixedly in terms of rotation thereon and which is designed with a region of the first shaft part covered by it as a rotary slide servo-valve arrangement.

8. Servo control arrangement according to claim 4, wherein the bush part is firmly connected releasably to a bush-like extension of the second shaft part which is arranged fixedly in terms of rotation thereon and which is designed with a region of the first shaft part covered by it as a rotary slide servo-valve arrangement.

9. Servo control arrangement according to claim 1, wherein the inflow is connected to the pressure source via a controllable throttle valve which controls the inflow pressure in response to at least one vehicle operating parameter, and wherein the controllable throttle valve assumes its relatively unthrottled state without a supply of energy to its actuating member.

10. Servo control arrangement according to claim 2, wherein the inflow is connected to the pressure source via a controllable throttle valve which controls the inflow pressure in response to at least one vehicle operating parameter, and wherein the controllable throttle valve assumes its relatively unthrottled state without a supply of energy to its actuating member.

11. Servo control arrangement according to claim 3, wherein the inflow is connected to the pressure source via a controllable throttle valve which controls the inflow pressure in response to at least one vehicle operating parameter, and wherein the controllable throttle valve assumes its relatively unthrottled state without a supply of energy to its actuating member.

12. Servo control arrangement according to claim 4, wherein the inflow is connected to the pressure source via a controllable throttle valve which controls the inflow pressure in response to at least one vehicle operating parameter, and wherein the controllable throttle valve assumes its relatively unthrottled state without a supply of energy to its actuating member.

13. Servo control arrangement according to claim 5, wherein the inflow is connected to the pressure source via a controllable throttle valve which controls the inflow pressure in response to at least one vehicle operating parameter, and wherein the controllable throttle valve assumes its relatively unthrottled state without a supply of energy to its actuating member.

14. Servo control arrangement according to claim 10, wherein a cut-off valve is arranged between the inflow and the controllable throttle valve, which cut-off valve breaks the inflow connection to the controllable throttle valve or to the pressure source above a threshold value of the pressure at the inflow.

15. Servo control arrangement according to claim 14, wherein the bush part is firmly connected releasably to a bush-like extension of the second shaft part which is arranged fixedly in terms of rotation thereon and which is designed with a region of the first shaft part covered by it as a rotary slide servo-valve arrangement.

16. Servo control arrangement according to claim 1, wherein the inflow is connected to the pressure source via a controllable throttle valve which controls the inflow pressure in response to at least one vehicle operating parameter.

17. Servo control arrangement according to claim 1, wherein the pressure source is a pump.

18. Servo control arrangement according to claim 1, wherein the bush part is firmly connected releasably to the second shaft part by a slot and threaded connection which permits adjustment of the rotation position of the bush part and the second shaft part.

19. Servo control arrangement according to claim 1, wherein the first shaft part is an input shaft part and the second shaft part is an output shaft part.

20. Servo control arrangement according to claim 2, wherein the first shaft part is an input shaft part and the second shaft part is an output shaft part.

21. Servo control arrangement according to claim 4, wherein the first shaft part is an input shaft part and the second shaft part is an output shaft part.

22. Servo control arrangement according to claim 5, wherein the first shaft part is an input shaft part and the second shaft part is an output shaft part.

23. Servo control arrangement according to claim 9, wherein the first shaft part is an input shaft part and the second shaft part is an output shaft part.

* * * * *